US012579006B2

(12) United States Patent (10) Patent No.: US 12,579,006 B2
Arputharaj et al. (45) Date of Patent: Mar. 17, 2026

(54) SYSTEMS AND METHODS FOR UNIVERSAL AUTO-SCALING

(71) Applicant: JPMORGAN CHASE BANK, N.A., New York, NY (US)

(72) Inventors: Sudhan Arputharaj, Singapore (SG); Srinu Dasari, Euless, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 709 days.

(21) Appl. No.: 17/817,109

(22) Filed: Aug. 3, 2022

(65) Prior Publication Data

US 2023/0040512 A1 Feb. 9, 2023

Related U.S. Application Data

(60) Provisional application No. 63/229,423, filed on Aug. 4, 2021.

(51) Int. Cl.
*G06F 9/50* (2006.01)
*G06F 11/34* (2006.01)

(52) U.S. Cl.
CPC ........ *G06F 9/5083* (2013.01); *G06F 11/3433* (2013.01); *G06F 2209/501* (2013.01); *G06F 2209/5022* (2013.01)

(58) Field of Classification Search
CPC ............... G06F 9/5083; G06F 11/3433; G06F 2209/501; G06F 2209/5022; G06F 2209/508; G06F 9/505
See application file for complete search history.

(56) References Cited

U.S. PATENT DOCUMENTS

| | | | | |
|---|---|---|---|---|
| 8,856,797 | B1 * | 10/2014 | Siddiqui | ................. H04L 67/51 |
| | | | | 718/104 |
| 9,448,824 | B1 * | 9/2016 | Fitzgerald | ........... G06F 9/45533 |
| 9,647,889 | B1 * | 5/2017 | Jones | .................. H04L 41/0823 |
| 10,324,763 | B1 * | 6/2019 | Abdelsalam | .............. G06F 8/65 |
| 10,409,642 | B1 * | 9/2019 | Tang | ..................... G06F 9/5005 |
| 10,411,960 | B1 * | 9/2019 | Jones | .................... H04L 41/082 |
| 10,761,889 | B1 * | 9/2020 | Jain | ........................ G06F 9/5005 |
| 10,761,893 | B1 * | 9/2020 | Bhadauria | ............. G06F 9/5044 |
| 10,782,990 | B1 * | 9/2020 | Suarez | .................. G06F 11/301 |
| 11,038,986 | B1 * | 6/2021 | Acar | ....................... H04L 67/34 |
| 11,113,665 | B1 * | 9/2021 | Rose | .................. G06Q 20/4014 |
| 12,224,906 | B2 * | 2/2025 | Cannata | ................ G06F 9/5077 |
| 2012/0254443 | A1 * | 10/2012 | Ueda | .................... H04L 67/1008 |
| | | | | 709/226 |
| 2016/0117180 | A1 * | 4/2016 | Cardonha | ........... G06F 11/3495 |
| | | | | 713/100 |

(Continued)

*Primary Examiner* — Benjamin C Wu

(74) *Attorney, Agent, or Firm* — GREENBERG TRAURIG LLP

(57) ABSTRACT

Systems and methods for universal auto-scaling are disclosed. In one embodiment, a method may include: (1) monitoring, by an auto-scale computer program executed by a computer processor, a utilization level at each of a plurality of data layers in a data pod, wherein each data layer comprises at least one node; (2) comparing, by the auto-scale computer program, each of the utilization levels to a threshold; (3) identifying, by the auto-scale computer program, that one of the thresholds is met or exceeded; and (4) deploying, by the auto-scale computer program, an additional node to the data layer with the met or exceeded utilization level.

14 Claims, 3 Drawing Sheets

(56)　　　References Cited

U.S. PATENT DOCUMENTS

| | | | | |
|---|---|---|---|---|
| 2016/0323187 A1* | 11/2016 | Guzman | | H04L 47/125 |
| 2016/0323188 A1* | 11/2016 | Guzman | | H04L 47/125 |
| 2016/0323197 A1* | 11/2016 | Guzman | | G06F 9/5083 |
| 2016/0323377 A1* | 11/2016 | Einkauf | | H04L 67/1031 |
| 2016/0381128 A1* | 12/2016 | Pai | | G06F 9/46 |
| | | | | 709/203 |
| 2017/0034064 A1* | 2/2017 | Everhart | | G06F 9/5011 |
| 2017/0228257 A1* | 8/2017 | Dong | | G06Q 10/04 |
| 2018/0039516 A1* | 2/2018 | Biran | | G06F 9/45558 |
| 2018/0241812 A1* | 8/2018 | Marchetti | | H04L 67/1023 |
| 2019/0340033 A1* | 11/2019 | Ganteaume | | H04L 43/16 |
| 2020/0183750 A1* | 6/2020 | Abdelsalam | | G06F 9/5027 |
| 2020/0301898 A1* | 9/2020 | Samynathan | | G06F 16/24542 |
| 2020/0327371 A1* | 10/2020 | Sharma | | G06N 5/04 |
| 2021/0042280 A1* | 2/2021 | Sharma | | G06F 16/24573 |
| 2021/0109789 A1* | 4/2021 | McWeeney | | G06F 9/5022 |
| 2022/0116289 A1* | 4/2022 | Ramanathan | | H04L 41/5051 |
| 2022/0237024 A1* | 7/2022 | Chen | | G06F 9/50 |
| 2022/0300305 A1* | 9/2022 | Vladimirskiy | | G06F 9/5022 |
| 2022/0413935 A1* | 12/2022 | Kantamneni | | G06F 9/5077 |
| 2023/0040512 A1* | 2/2023 | Arputharaj | | G06F 9/505 |
| 2024/0012667 A1* | 1/2024 | Mohanty | | G06F 9/5077 |

* cited by examiner

SYSTEMS AND METHODS FOR UNIVERSAL AUTO-SCALING

RELATED APPLICATIONS

This application claims priority to, and the benefit of, U.S. Provisional Patent Application Ser. No. 63/229,423 filed Aug. 4, 2021, the disclosure of which is hereby incorporated, by reference, in its entirety.

BACKGROUND OF THE INVENTION

1. Field of the Invention

Embodiments are generally directed to systems and methods for universal auto-scaling.

2. Description of the Related Art

In widely distributed data ingestion systems, increases in data loads is common due to debugging or additional devices in a data center or an office. These loads crate creates spikes that can impact the Service Level Agreement (SLA) of data transfer rates.

SUMMARY OF THE INVENTION

Systems and methods for universal auto-scaling are disclosed. In one embodiment, a method for universal auto-scaling may include: (1) monitoring, by an auto-scale computer program executed by a computer processor, a utilization level at each of a plurality of data layers in a data, wherein each data layer comprises at least one node; (2) comparing, by the auto-scale computer program, each of the utilization levels to a threshold; (3) identifying, by the auto-scale computer program, that one of the thresholds is met or exceeded; and (4) deploying, by the auto-scale computer program, an additional node to the data layer with the met or exceeded utilization level.

In one embodiment, the plurality of data layers may include a data ingestion layer, a data messaging layer, a data enrichment layer, and/or a data connect layer.

In one embodiment, each node may include a virtual machine.

In one embodiment, the utilization levels may include a central processing unit utilization level, a memory utilization level, and/or a network utilization level.

In one embodiment, at least one of the thresholds is set by a user. In another embodiment, at least one of the thresholds is set based on a trained machine learning engine. The trained machine learning engine may predict the threshold being met or exceeded before the threshold is met or exceeded.

According to another embodiment, a method for universal auto-scaling may include: (1) monitoring, by an auto-scale computer program executed by a computer processor, a utilization level at each of a plurality of data layers in a data, wherein each data layer comprises a plurality of nodes; (2) comparing, by the auto-scale computer program, each of the utilization levels to a lower threshold; (3) identifying, by the auto-scale computer program, that one of the lower thresholds is met or exceeded; and (4) removing, by the auto-scale computer program, one of the plurality of nodes in the data layer with the met or exceeded low utilization level.

In one embodiment, the plurality of data layers may include a data ingestion layer, a data messaging layer, a data enrichment layer, and/or a data connect layer.

In one embodiment, each node may include a virtual machine.

In one embodiment, the utilization levels may include a central processing unit utilization level, a memory utilization level, and/or a network utilization level.

In one embodiment, at least one of the lower thresholds is set by a user. In another embodiment, at least one of the lower thresholds is set based on a trained machine learning engine. The trained machine learning engine may predict the lower threshold being met or exceeded before the lower threshold is met or exceeded.

According to another embodiment, a system may include a plurality of data producers producing data, a pod comprising a plurality of data layers that receives the data from the plurality of data producers, a data store that receives data from the pod, and an auto-scale computer program executed by an electronic device in communication with the plurality of data layers that monitors a utilization level at each of the plurality of data layers in a data, compares each of the utilization levels to a threshold, identifies that one of the thresholds is met or exceeded, and adds a new node to the data layer with the met or exceeded utilization level.

In one embodiment, the plurality of data layers may include a data ingestion layer, a data messaging layer, a data enrichment layer, and/or a data connect layer.

In one embodiment, each node may include a virtual machine.

In one embodiment, the utilization levels may include a central processing unit utilization level, a memory utilization level, and/or a network utilization level.

In one embodiment, at least one of the thresholds is set by a user. In another embodiment, at least one of the thresholds is set based on a trained machine learning engine. The trained machine learning engine may predict the threshold being met or exceeded before the threshold is met or exceeded.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments generally relate to systems and methods for universal auto-scaling.

Embodiments are directed to a service for managing massive volumes of machine data traffic, such as events, logs, metrics, alerts, reference data, etc., reliably and efficiently. Embodiments provide a unified collection strategy, streamlined data enrichment, and a data pipeline approach that supports any data format and any ingestion protocol.

The service may include multiple data layers, including data ingestion, data messaging, data transformation, and data connect. These data layers may exist in a single unit, such as a "pod," and may provide resiliency. A pod may have a specific function or purpose based on a logical grouping of functions, services, etc. Each data layer may also have several functions and may work in a highly available and scalable mode. A data center may be provided with one or more pods depending on the nature of the data center.

The service may be distributed across multiple zones and data centers to receive data from any device or system.

Embodiments may provide the following: optimized resource utilization, minimized resource waste, the ability to automatically scale up or down any of the data layers hosted on VSI Linux server (Virtual Server Infrastructure) through automated software defined system.

Embodiments may further respond to cyber, hijacks or malware attacks by rebuilding the pods in any datacenter to ensure business as usual. Similarly, embodiments may rebuild pods in response to outages and other events (natural and man-made). For example, the entire server (VSI Linux host) may be re-created, and application components may be reinstalled and configured to bring to desired state.

Embodiments may rebuild portions of or the entire pod and data layers in a new datacenter in case of datacenter disruption due to, for example, natural calamities or accidental outages. The auto scale program leverages Repave capability to get the pod to a good known state using software defined configurations and avoid business interruption and efficient recovery rebuild system.

Embodiments may provide a global solution with composable components in elastic/auto manner to handle high volumes/loads.

Embodiments may include a self-service capability for restricted users with the ability to self-service the entire recovery system of pods while enabling speed, reusability, resiliency and enhanced reporting (e.g., full audit trails and execution history). This may be partially or fully automated.

Embodiments may be further based on decisions on cyber events and organic growth criteria.

Embodiments may further store usage, addition, and removal history, as well as details for tracking and auditing purposes.

Figure 1:
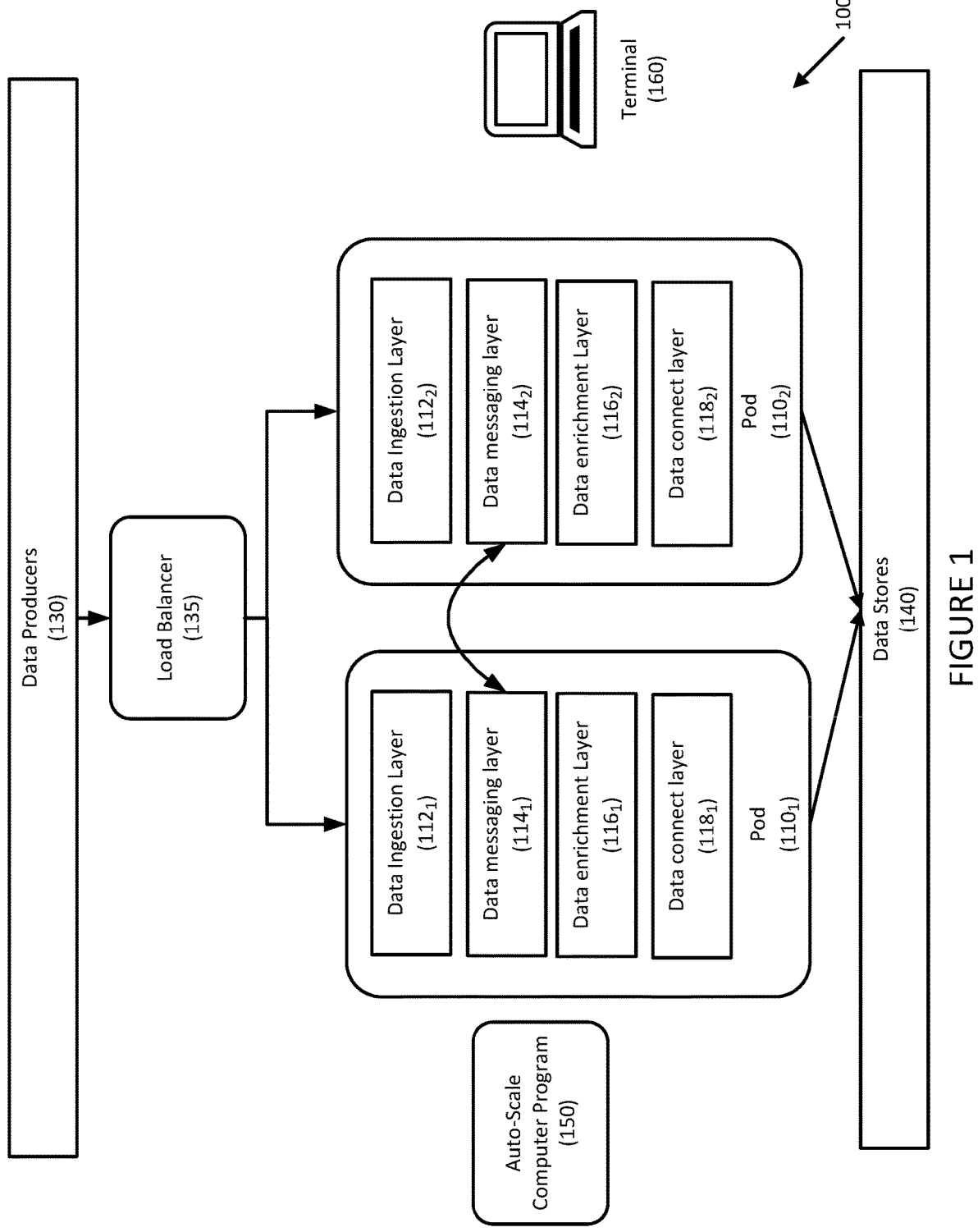
FIG. 1 illustrates a system for universal auto-scaling according to one embodiment.

FIG. 1 depicts an exemplary illustration of a system for universal auto-scaling is provided. System 100 may include a plurality of pods (e.g., pod 110₁, pod 110₂, etc.). Although only two pods 110 are depicted in FIG. 1, it should be noted that additional pods 110 may be included as is necessary and/or desired.

Each pod 110 may include a plurality of data layers, such as data ingestion layer 112 (e.g., 112₁, 112₂), data messaging layer 114 (e.g., 114₁, 114₂), data enrichment layer 116 (e.g., 116₁, 116₂), and data connect layer 118 (e.g., 118₁, 118₂). For example, data ingestion layer 112 may include a Producer Proxy Agent (PPA) layer and an ingestion API. Data messaging layer 114 may include a data messaging service layer that may provide data replication across pods 110. Data enrichment layer 116 may include a structural query language feature on streaming data to reduce the programming effort, such as KSQL. And data connect layer 118 may be supported by a declarative data integration framework, such as Kafka Connect.

Other data layers, such as a data transformation layer (not shown), may be provided as is necessary and/or desired.

Each data layer may be provided with one or more nodes, such as virtual machines or similar, that may execute the functions and services of each data layer. The nodes may be horizontally scalable in a dynamic manner.

Pods 110 may receive data from data producers 130 via load balancer 135. Data producers 130 may include any producer of data, including any data agent or data source that sends data. Data producers 130 may send raw data or derived products. For example, data may be sent by push or pull approaches. Load balancer 135 may be any suitable type of load balancer, including geographic load balancers.

Data from pods 110 may be stored in data stores 140.

In one embodiment, one or more auto-scale computer programs 150 may be provided to detect increases in data loads. For example, auto-scale computer program 150 may be provided for each pod 110; in another embodiment, auto-scale computer program 150 may be provided for each data layer (e.g., 112, 114, 116, 116) or for a plurality of data layers in each pod 110. Auto-scale computer program 150 may monitor each data layer, such as CPU usage, memory usage, network utilization, application behavior, connections, events, log files, etc. and may compare that data to one or more thresholds, such as an upper threshold (i.e., for adding a node) or a lower threshold (i.e., for removing a node). Auto-scale computer program 150 may add additional nodes to any data layer as necessary. Embodiments may use an algorithm, machine learning, etc. to determine the conditions for adding or removing nodes.

In embodiments, the triggers and/or thresholds for adding or removing nodes may be based on customizable thresholds, machine learning, etc. In one embodiment, a user may set the triggers and/or thresholds via terminal 160. In another embodiment, a trained machine learning model may analyze usage data (e.g., CPU usage, memory usage, network usage, etc.) from each pod 110 and may determine whether to add or remove nodes from any of the data layers. The trained machine learning model may further predict spikes and may proactively add nodes to prevent spikes rather than respond to spikes.

In one embodiment, a buffer (not shown) may be provided to facilitate the addition or removal of nodes. The buffer may be used by any data layer as needed.

Figure 2:
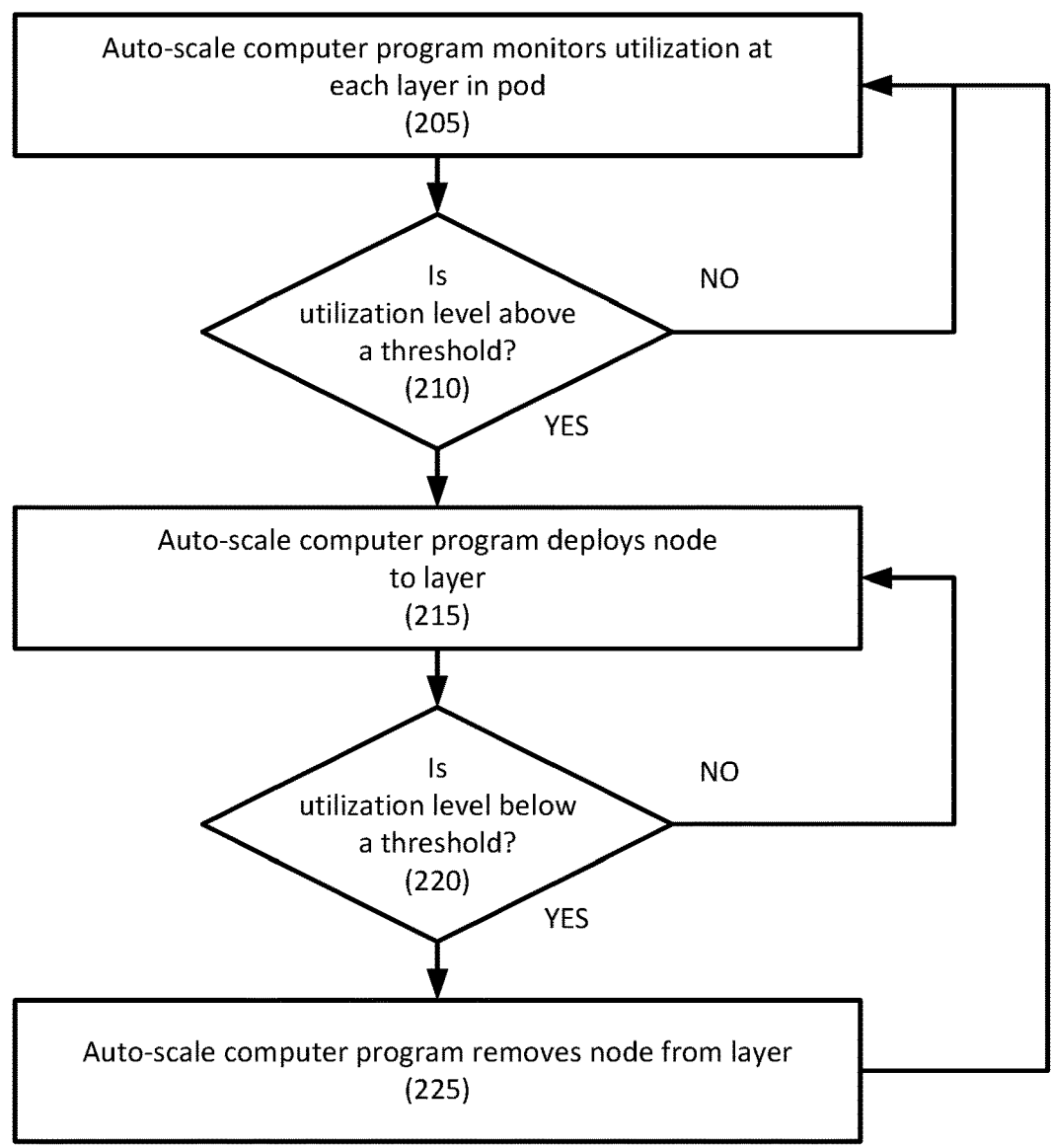
FIG. 2 depicts a method for universal auto-scaling according to one embodiment.

Referring to FIG. 2, a method for universal auto-scaling is provided according to an embodiment.

In step 205, an auto-scale computer program may monitor utilization level at each data layer of a pod. Example data layers may include a data ingestion layer, a data messaging layer, a data enrichment layer, and a data connect layer. Each data layer may include one or more nodes, such as virtual machines.

Examples of data that may be monitored may include CPU usage, memory usage, network utilization, application behavior, a number of connections, events, etc. In one embodiment, the auto-scale computer program may receive and review log files from the data layers.

In step 210, the auto-scale computer program may compare the utilization level to a threshold. If the utilization level meets or exceeds the threshold, in step 215, the auto-scale computer program may deploy a node including one or more virtual machines to the data layer with the high utilization level. If it is not the auto-scale computer program may continue to monitor utilization levels in step 210.

In one embodiment, the threshold may be configured by the user; in another embodiment, the threshold may be determined based on historical data using, for example, a trained machine learning algorithm. The trained machine learning algorithm may predict when the threshold will be met or exceeded and may proactively deploy nodes as is necessary and/or desired.

In one embodiment, the auto-scale computer program may also monitor utilization levels to determine if the utilization level is below a lower threshold. If it is, the auto-scale computer program may remove a node.

In one embodiment, a minimum number of nodes may be required for each data layer.

In step 220, after adding a node, the auto-scale computer program may continue to monitor utilization levels, and when the utilization level falls below a lower threshold may, in step 225, remove the additional node from the data layer.

Figure 3:
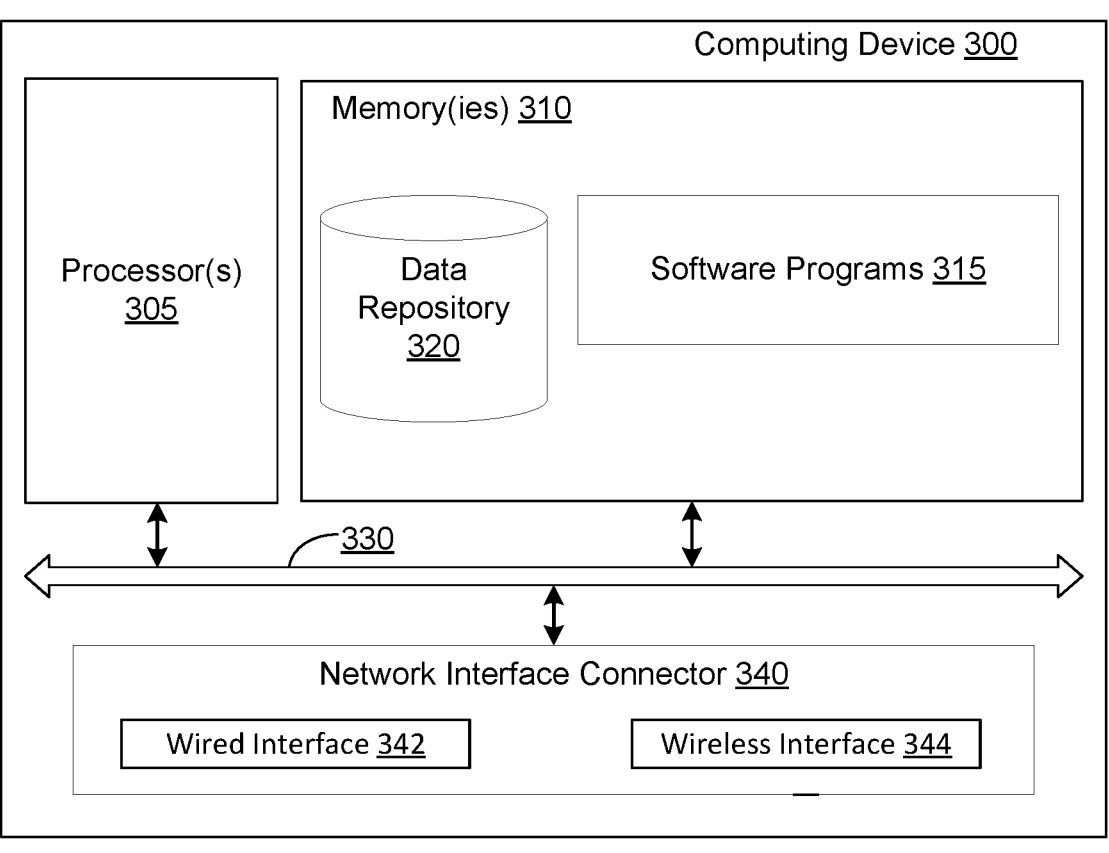
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for universal auto-scaling, comprising:
monitoring, by an auto-scale computer program executed by a computer processor, a data layer utilization level for each of a plurality of data layers in a pod, wherein the plurality of data layers comprise a data ingestion layer, a data messaging layer, a data enrichment layer, and a data connect layer, wherein each data layer comprises at least one node and wherein each node comprises a virtual machine;
comparing, by the auto-scale computer program, each of the data layer utilization levels to a threshold for that data layer;
determining, by the auto-scale computer program, that one of the thresholds is met or exceeded; and
deploying, by the auto-scale computer program, an additional node comprising an additional virtual machine to the data layer with the met or exceeded data layer utilization level.

2. The method of claim 1, wherein the data layer utilization levels comprise a central processing unit utilization level, a memory utilization level, and/or a network utilization level.

3. The method of claim 1, wherein at least one of the thresholds is set by a user.

4. The method of claim 1, wherein at least one of the thresholds is set based on a trained machine learning engine.

5. The method of claim 4, wherein the trained machine learning engine predicts the threshold being met or exceeded before the threshold is met or exceeded.

6. A method for universal auto-scaling, comprising:

monitoring, by an auto-scale computer program executed by a computer processor, a data layer utilization level for each of a plurality of data layers in a pod, wherein the plurality of data layers comprise a data ingestion layer, a data messaging layer, a data enrichment layer, and a data connect layer, wherein each data layer comprises at least one node and wherein each node comprises a virtual machine;

comparing, by the auto-scale computer program, each of the data layer utilization levels to a lower threshold for that data layer;

determining, by the auto-scale computer program, that one of the lower thresholds is met or exceeded; and removing, by the auto-scale computer program, one of the plurality of nodes in the data layer comprising a virtual machine with the met or exceeded low data layer utilization level.

7. The method of claim 6, wherein the data layer utilization levels comprise a central processing unit utilization level, a memory utilization level, and/or a network utilization level.

8. The method of claim 6, wherein at least one of the lower thresholds is set by a user.

9. The method of claim 6, wherein at least one of the lower thresholds is set based on a trained machine learning engine.

10. The method of claim 9, wherein the trained machine learning engine predicts the lower threshold being met or exceeded before the lower threshold is met or exceeded.

11. A system, comprising:

a plurality of data producers producing data;

a pod comprising a plurality of data layers, wherein the plurality of data layers comprise a data ingestion layer, a data messaging layer, a data enrichment layer, and a data connect layer, wherein each data layer comprises at least one node and wherein each node comprises a virtual machine that receives the data from the plurality of data producers;

a data store that receives data from the pod; and an electronic device executing an auto-scale computer program in communication with the plurality of data layers that monitors a data layer utilization level for each of the plurality of data layers in a data, compares each of the data layer utilization levels to a threshold for that data layer, identifies that one of the thresholds is met or exceeded, and adds a new node comprising an additional virtual machine to the data layer with the met or exceeded data layer utilization level.

12. The system of claim 11, wherein the data layer utilization levels comprise a central processing unit utilization level, a memory utilization level, and/or a network utilization level.

13. The system of claim 11, wherein at least one of the thresholds is set by a user.

14. The system of claim 11, wherein at least one of the thresholds is set based on a trained machine learning engine.

* * * * *